United States Patent
Singhal et al.

(10) Patent No.: US 9,588,667 B2
(45) Date of Patent: Mar. 7, 2017

(54) TRANSFORMATION OF TABULAR DATA ACROSS MULTIPLE BROWSER VIEWPORTS

(71) Applicant: Microsoft Corporation, Redmond, WA (US)

(72) Inventors: Rohan Singhal, Bellevue, WA (US); Joel Schweitzer, Kirkland, WA (US); Annice Jumani, Seattle, WA (US); Carolina Hernandez, Seattle, WA (US); Panuruj Khambanonda, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 91 days.

(21) Appl. No.: 14/164,174

(22) Filed: Jan. 25, 2014

(65) Prior Publication Data
US 2015/0212715 A1    Jul. 30, 2015

(51) Int. Cl.
*G06F 3/00* (2006.01)
*G06F 3/0484* (2013.01)
*G06F 17/24* (2006.01)

(52) U.S. Cl.
CPC ........ *G06F 3/04847* (2013.01); *G06F 17/245* (2013.01)

(58) Field of Classification Search
CPC .............................. G06F 17/211; G06F 17/247
See application file for complete search history.

(56) References Cited

U.S. PATENT DOCUMENTS

| | | | |
|---|---|---|---|
| 5,812,131 A * | 9/1998 | Bertram | G06F 1/1626 345/905 |
| 6,976,226 B1 | 12/2005 | Strong et al. | |
| 7,032,181 B1 | 4/2006 | Farcasiu | |
| 7,200,615 B2 | 4/2007 | Eschbach et al. | |
| 8,271,866 B2 * | 9/2012 | Chen | G06F 17/30896 715/218 |
| 2004/0107403 A1 * | 6/2004 | Tetzchner | G06F 17/30905 715/227 |

(Continued)

FOREIGN PATENT DOCUMENTS

EP    1550961 A1    7/2005

OTHER PUBLICATIONS

"New jQuery Table Plugins to Organize Your Data—21 Items", Published on: Oct. 18, 2012, Available at: http://www.designyourway.net/drb/new-jquery-tables-plugins-to-organize-your-data-21-items/.

(Continued)

*Primary Examiner* — Omar Abdul-Ali
(74) *Attorney, Agent, or Firm* — Daniel Choi; Micky Minhas

(57) ABSTRACT

Systems and methods are disclosed regarding the reformatting tabular data in a browser on a client device received from a server. The browser on the client device is capable of being resized in a number of potential sizes—e.g., desktop browser viewport, laptop browser viewport, tablet browser viewport and mobile browser viewport. Tabular data may comprise main data, row data and associated column data. Depending on the browser viewport, one embodiment may dynamically position the tabular data so that the associated column data is displayed near its associated row data.

20 Claims, 6 Drawing Sheets

(56) References Cited

U.S. PATENT DOCUMENTS

| | | | | |
|---|---|---|---|---|
| 2005/0278418 A1* | 12/2005 | Rathakrishnan | .......... | G06F 8/67 709/203 |
| 2006/0117253 A1* | 6/2006 | Polash | ................. | G06F 17/211 715/247 |
| 2014/0068403 A1* | 3/2014 | Bhargav | ............... | G06F 17/246 715/212 |

OTHER PUBLICATIONS

"Responsive Tables", Retrieved on: Oct. 15, 2013, Available at: http://jquerymobile.com/demos/1.3.0-beta.1/docs/tables/.

"Research: Responsive Tables", Retrieved on: Oct. 15, 2013, Available at: https://github.com/ucla/WebBlocks/wiki/Research%3A-Responsive-Tables.

Anderson, Rick, "ASP.NET MVC 4 Mobile Features", Published on: Aug. 15, 2012, Available at: http://www.asp.net/mvc/tutorials/mvc-4/aspnet-mvc-4-mobile-features.

"Responsive Web Design Techniques, Tools and Design Strategies", Published on: Jul. 22, 2011, Available at: http://mobile.smashingmagazine.com/2011/07/22/responsive-web-design-techniques-tools-and-design-strategies/.

Thompson, Tom, "Displaying Tabular Data on iPhones", Published on: Mar. 5, 2011, Available at: http://www.drdobbs.com/mobile/displaying-tabular-data-on-iphones/229218541.

Storey, Dudley, "Creating Fully Responsive Table Designs", Published on: Aug. 10, 2013, Available at: http://demosthenes.info/blog/681/Creating-Fully-Responsive-Table-Designs.

"Handling Data Tables Responsively", Published on: Jul. 19, 2013, Available at: http://christophercochran.me/tutorial/handling-data-tables-responsively/.

Jin, "The Big Table Issue", Published on: Jan. 8, 2009, Available at: http://www.8164.org/the-big-table-issue/.

\* cited by examiner

TRANSFORMATION OF TABULAR DATA ACROSS MULTIPLE BROWSER VIEWPORTS

BACKGROUND

Tabular data is easily viewed when the browser's viewport is sufficiently large for the data to be presented across multiple columns. However, creating a responsive presentation for tabular data may have the challenge of adapting the content to fit screen size, while still making it convey the same information. Moreover, additional complexity may be introduced when there are row and column spans used in the table, since multiple relationships are often desired to be expressed.

Many conventional representations of tabular data are often completely replaced across viewports and new data is presented to the user, and sometimes there may be data loss since not all of the original information is retained. This may also tend to add duplicate content on the page which is not visible at all times, and which may negatively impact the user friendliness.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Systems and methods are disclosed regarding the reformatting tabular data in a browser on a client device received from a server. The browser on the client device is capable of being resized in a number of potential sizes—e.g., desktop browser viewport, laptop browser viewport, tablet browser viewport and mobile browser viewport. Tabular data may comprise main data, row data and associated column data. Depending on the browser viewport, one embodiment may dynamically position the tabular data so that the associated column data is displayed near its associated row data.

In one embodiment, a method is disclosed for implementing an responsive UI for rendering a set of tabular data across a plurality of browser viewports, the method comprising: inputting a set of tabular data, said set of tabular data capable of being rendered in a browser for a user of a computer system; detecting the viewport of the browser in which said set of tabular data are to be rendered; if the viewport is greater than a desired size, then rendering said set of tabular data in a first format, said first format formatting said set of tabular data in a multiple row and column spans; if the viewport is less than or equal to a desired size, then rendering said set of tabular data in a second format, said second format comprising collapsing said column spans into a row in order to format column data to be substantially close to its associated row header; and if the browser is resized to another screen size, rendering said set of tabular data as appropriate for said resized screen.

In another embodiment, a computer system is disclosed comprising: a processor; a computer readable memory, said computer readable memory capable of storing computer readable data and instructions; a communications component, said communications component capable of receiving a set of nested data categories from a second computer system external to said computer system; a screen, said screen capable of rendering data and displaying said data to a user of said computer system; a set of UI components, said set of UI components capable of being used by said user to interact with said data rendered on said screen; and a browser, said browser capable of being resized into one of a plurality of viewports and rendering said set of tabular data according to the current viewport of said browser.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
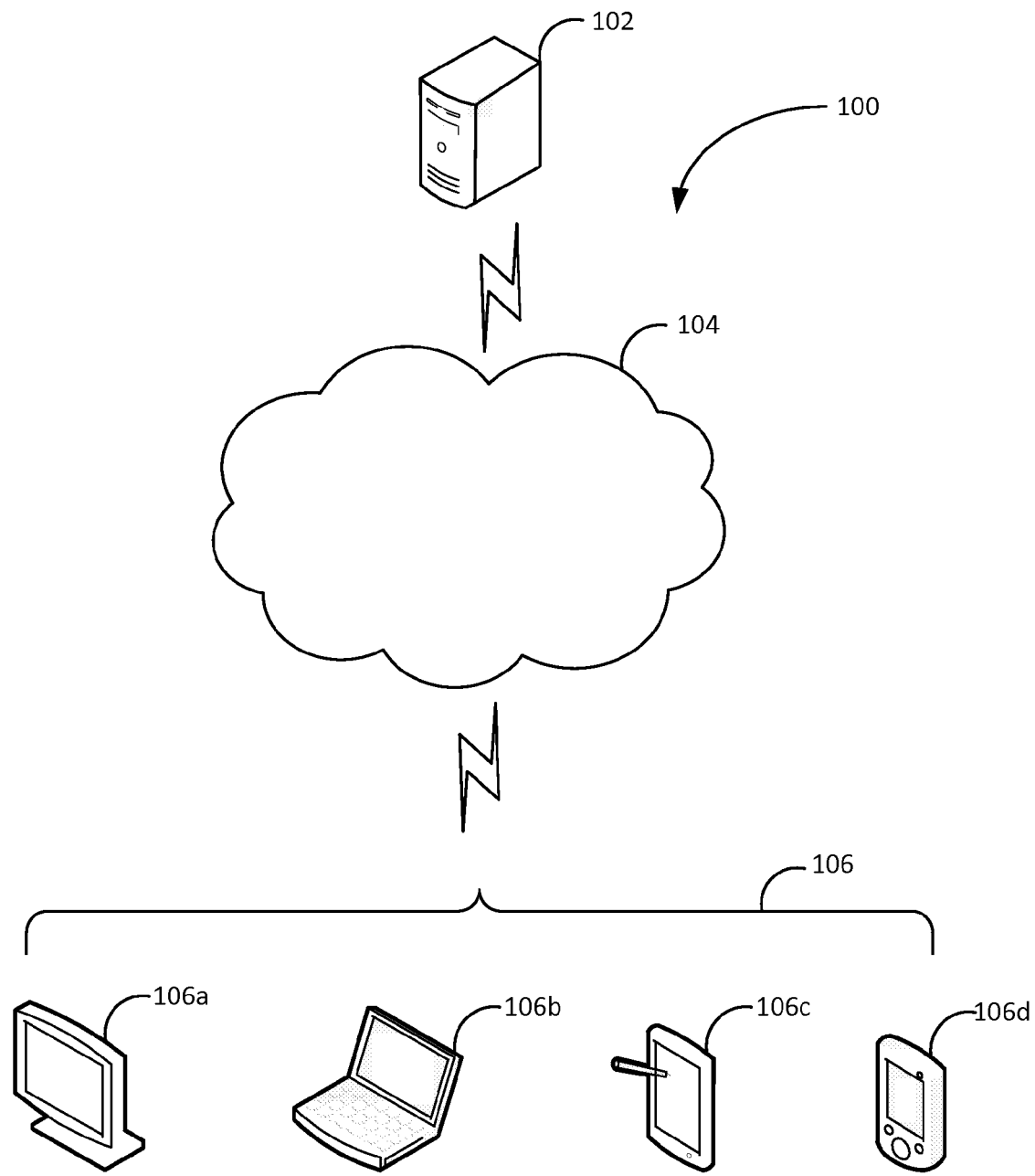
FIG. 1 depicts one exemplary environment in which present systems, methods and/or techniques may reside, as made in accordance with the principles of the present application.

As utilized herein, terms "component," "system," "interface," "controller" and the like are intended to refer to a computer-related entity, either hardware, software (e.g., in execution), and/or firmware. For example, any of these terms can be a process running on a processor, a processor, an object, an executable, a program, and/or a computer. By way of illustration, both an application running on a server and the server can be a component and/or controller. One or more components/controllers can reside within a process and a component/controller can be localized on one computer and/or distributed between two or more computers.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Exemplary Environment

In many embodiments of the present systems and methods, adaptive UIs for adapting multiple column layouts (e.g., to a single column layout) may reside and be implemented in a number of places—either singly or in combination—within a variety of typical computing and networking environments. For example, such adaptive UIs may reside on a single computing device or may reside on a server that is connected to various computing devices via a wired or wireless network.

FIG. 1 is one exemplary environment (100) in which the present systems and techniques of the present application may reside and/or be implemented. As mentioned, the present systems and/or methods may reside on a server 102 that may affect the adaptive UI (as disclosed herein) via a network 104 (e.g. Internet or other networking configuration) to one or more client computers 106. Computers 106 may comprise any possible computing device; and more particularly, two different computing devices have different display screen sizes (upon which various data/metadata may be rendered—e.g., webpages having data/metadata formatted for a particular screen size). For example, computing devices 106 may comprise desktop 106a, laptop 106b, tablet 106c and/or smart device/phone 106d.

In one embodiment, the server may render enough markup to support any screen size, and a rendering decision may be made on the device via a combination of CSS and JavaScript. For this embodiment, it may suffice that the only communication between device and server is for the page request and response.

In a different embodiment, it may be possible that a device may communicate (e.g., via any known protocol) to server and indicate to server what display screen size the device may have. In such a case, server may affect an adaptive UI experience to the user of the device, possibly depending upon what the user of the device may do in order to structure data within a browser that may be re-sized upon the display screen.

For one exemplary event, a user on a desktop may resize a browser to another viewport—e.g., increase the viewport to utilize the full screen of the desktop. But, in another case, the user may desire to shrink the browser/viewport to a smaller size (e.g., the size approximating a desktop screen size, a laptop screen size, tablet size and/or smart device size) in order to arrange the user's view of the various other information windows and/or viewports on the display screen. A common example might be the user has a browser open on the display screen; but may desire to dynamically resize the browser—e.g., so as to view other information such as a word processing document to work concurrently while viewing the browser.

As mentioned, the systems and methods of the present application may be used in other than a client-server setting—e.g., as on an individual computing devices. The present systems may reside in the operating system, applications, or in another part of the computing device.

Figure 2:
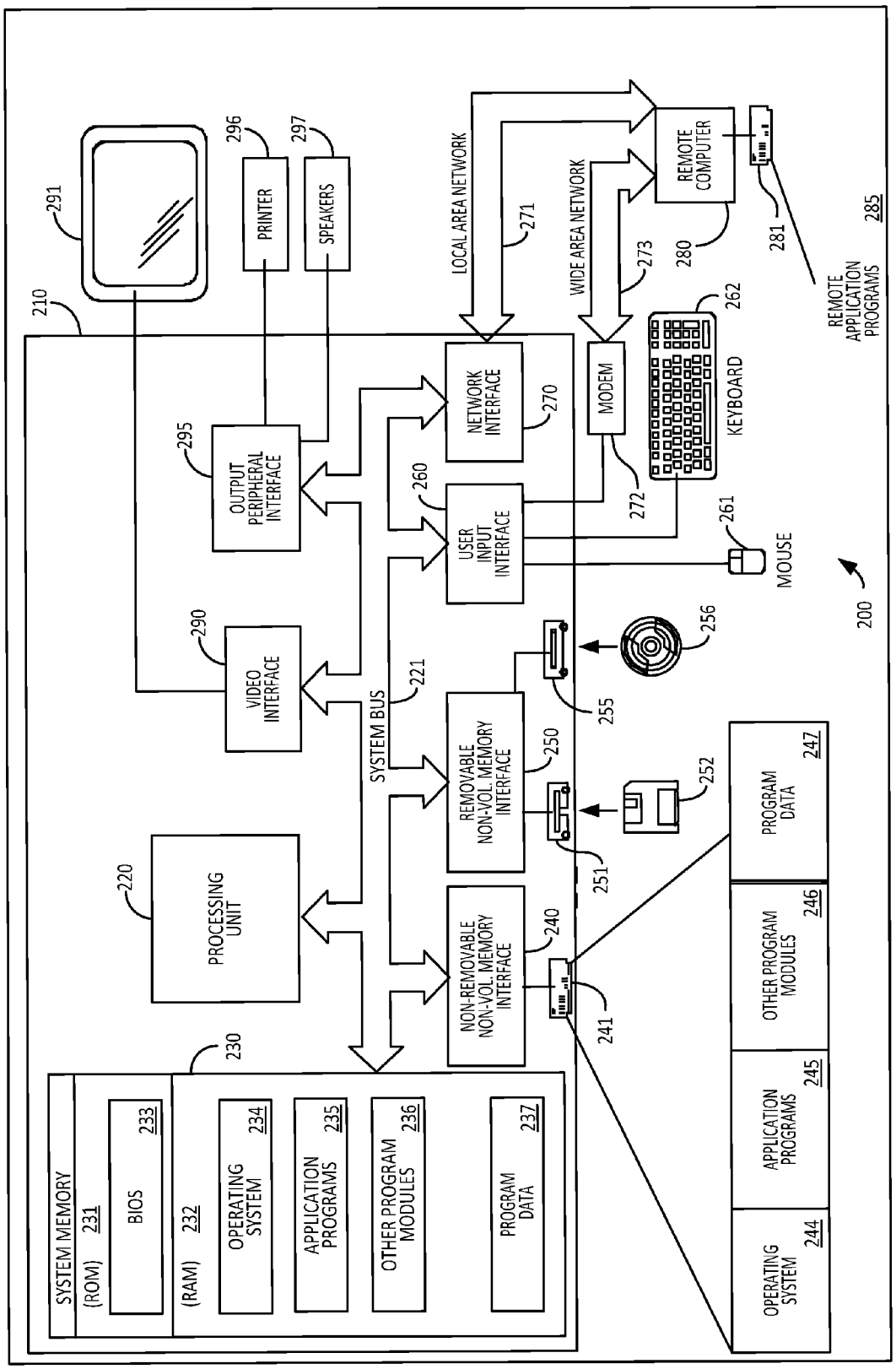
FIG. 2 shows one embodiment of an exemplary computer system that may run and/or host the methods and/or techniques of the present application.

FIG. 2 illustrates an example of a suitable computing system environment 200 in which the present systems and/or methods may be implemented, in whole or in part on, e.g., computers 106 (106a, 106b, 106c and/or 106d). The computing system environment 200 is only one example of a suitable computing environment and is not intended to suggest any limitation as to the scope of use or functionality of the present application. Neither should the computing environment 200 be interpreted as having any dependency or requirement relating to any one or combination of components illustrated in the exemplary operating environment 200.

The present systems/methods may be operational with numerous other general purpose or special purpose computing system environments or configurations. Examples of well-known computing systems, environments, and/or configurations that may be suitable for use with the present application include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The present application may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the present system/method may comprise a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

Overview of Adaptive UI Environments

In many embodiments herein, systems and methods may transform tabular data of any complexity, taking into account row and column span scenarios, into a presentation that preserves data relationships across all browser viewports. It may be desirable that all of the data is preserved and the main table-cell content is not duplicated. In another embodiment, the presentation of the content may tend to make it simple for the user to still parse the data contained in the page.

While the main table content is not duplicated during transformation of the table, information in the table header may be duplicated at smaller browser viewports to convey information more clearly. As the browser viewport shrinks, the layout for table cells may change so that—instead of appearing horizontally adjacent to each other in the same row—the cells collapse into a view where they occupy their own row, since there may not be enough space to show the cells horizontally.

This change may result in the loss of the data relation between the header and the cell (e.g., since the relation depends on the cells being positioned vertically below the respective header cells). In order to solve this, just the header associated with a particular content cell may be duplicated within that cell, so that the header information associated that cell may still be retained and easily viewed at smaller browser viewports. The header content that is duplicated may be shown at the viewport sizes when the cells start occupying their own row, and may be hidden at other viewports.

In some embodiments, table cells may have column span or row span attributes. In such cases, additional data duplication may be desired to retain all of the original information. The entire cell that has a span attribute may be duplicated for each additional cell it spans (e.g., so a cell that has a span attribute value of 2 may be duplicated once, one with a value of 3 may be duplicated twice and so on)—so that it may be rendered with the appropriate header at the viewport size where the cells collapse into rows. Cells that have a column span attribute may be duplicated within the same row, but cells with rowspan attributes may be duplicated across rows. The duplicate cells created for cells with span attributes may be shown at the viewport sizes when the cells start occupying their own row, and these duplicate cells may be hidden at other viewport sizes.

In other embodiments, alternative implementations may involve a few approaches. One approach may make use of hard coded styles and hard coded content, which relies on knowing how content will look before the page is rendered. This way, instead of duplicating header cells, content may be inserted into the page through CSS (using the CSS "content" property).

However, this may tend to be an inflexible approach and may not work with authorable content. It tends to rely on a custom solution for each table that is desired to be made responsive, and may not be scalable at all for a site that has multiple tables across multiple site locales, and may not work automatically but rely on manual tweaking for every individual table.

In another embodiment, another approach may involve duplication of the entire table, and then showing the duplicate table at smaller viewports, while hiding the original table at the same viewport size. This implementation may be easier to execute in code since the code path may be different for the two tables. Each code path may not have to account for limitations/dependencies of the other.

One Exemplary Embodiment

Figure 3:
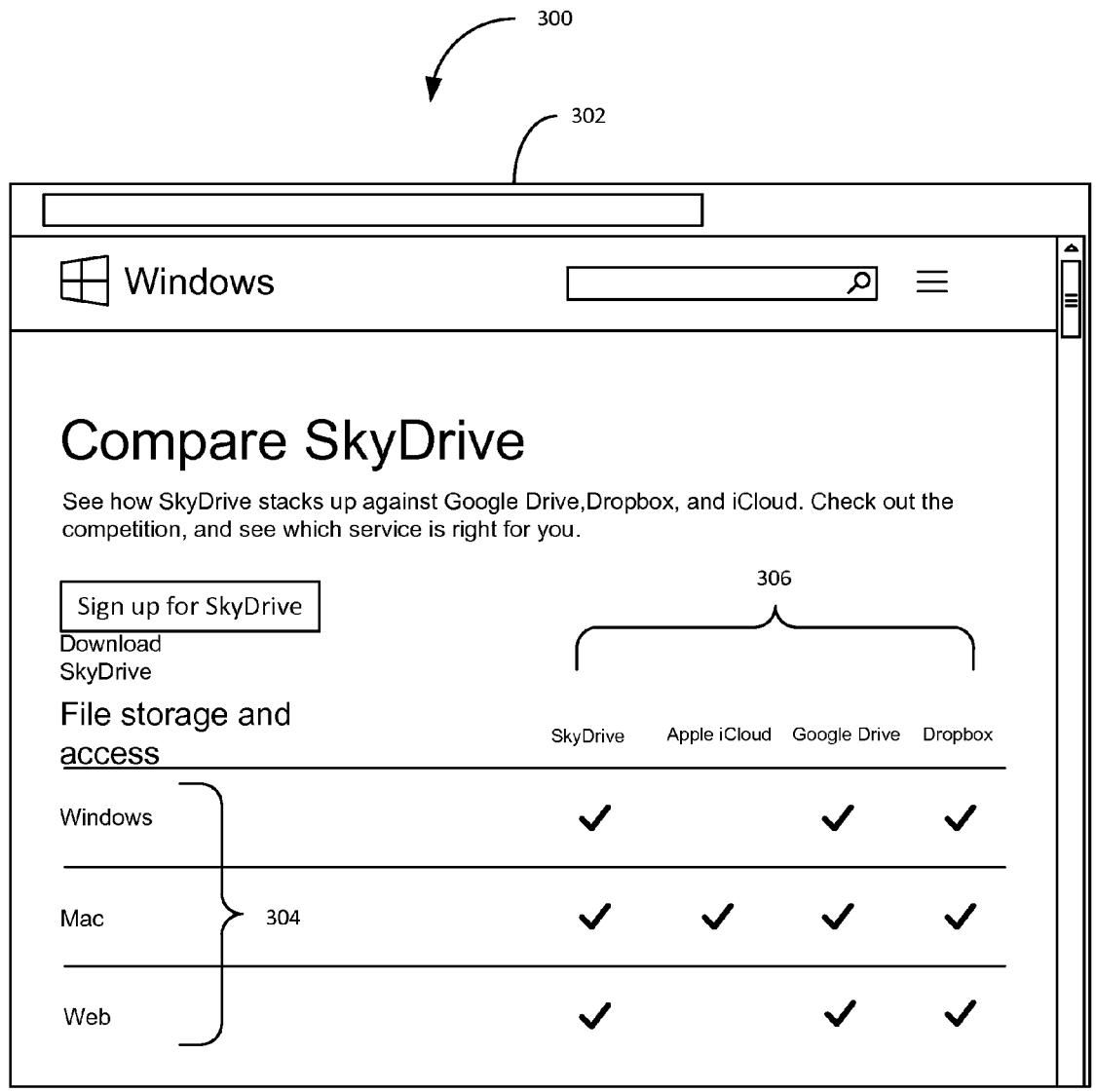
FIGS. 3, 4 and 5 represent the dynamic resizing and reflow of logic that occurs when a table is rendered across a number of browser viewports.
Figure 4:
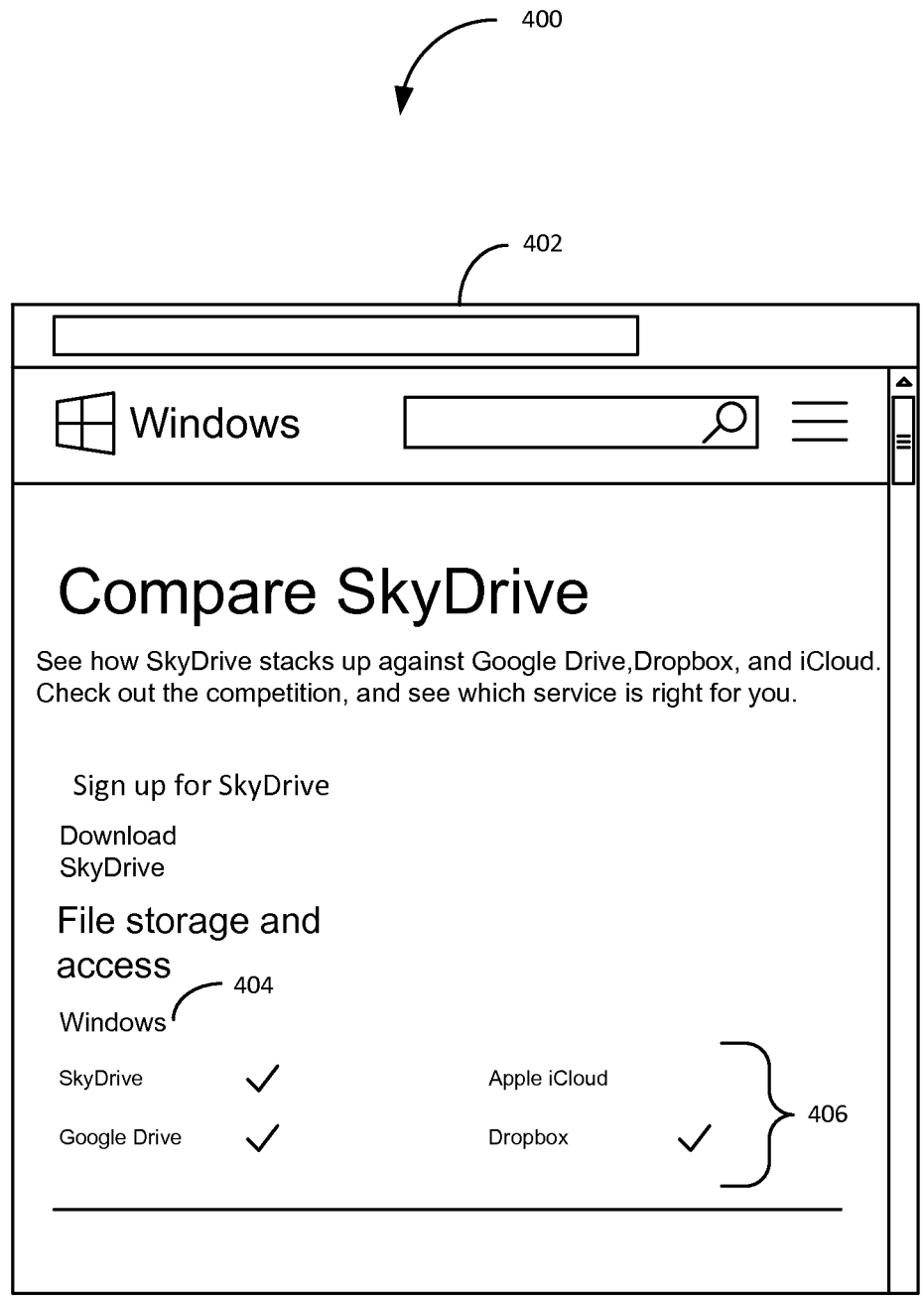
Figure 5:

The above discussion may be illustrated by one exemplary embodiment in the context of the FIGS. 3, 4 and 5. FIGS. 3, 4 and 5 represent the dynamic resizing and reflow of logic that occurs when a table is rendered in a browser viewport of a desktop, tablet and/or laptop and mobile viewport, respectively. FIG. 3 depicts the table 300 in a large (e.g., desktop and/or laptop) viewport 302. Multiple rows 304 may be seen in this viewport and the column data 306 may be likewise be displayed.

As the user (and/or system) resizes (e.g., shrinks) the viewport (as in FIG. 4), the presentation of the table data 400 may change once the size of the viewport 402 crosses a desired size threshold. As may be seen, the spacing between the individual rows 404 may become large—as the column data 406 changes format (e.g., in a two row format). This allows the user a localized relevant view of column data, as it pertains most logically to the individual row element 404.

In FIG. 5, as the browser viewport 502 shrinks even further, the tabular data 500 may change formatting once again of the column data 506—e.g., to assume a row formatting. This allows the user to quickly scroll through the original data in a mobile viewport setting.

In an another embodiment, the adaptive UI comprising such reformatting may also change its interaction model for switching between data categories and content layout—e.g., based on the size of the viewport. FIGS. 3, 4 and 5 depict such an embodiment and provide details about how the responsive UI may adapt based on viewport size.

In many embodiments, the adaptive UI may receive or otherwise input a set of tabular data. For example, the set of tabular data may represent a set of subject matter related data. In addition, the set of tabular data categories may be nested to multiple (e.g., two or more) levels of logic—e.g., wherein different level may have click targets for the browser or otherwise functional logic with which the user may interact.

In addition to the dynamic change of creating different click targets in some adaptive UIs, it is possible and/or desirable to have the system dynamically change the order, arrangement and/or position of some information that may be relevant to the main article and/or information—e.g., on a webpage. Such dynamical change in position and/or order of information may be dependent on the relevancy of the data to the main article.

For the present expository purposes, the adaptive UI will now be described in the context of responsive tab control—e.g., such as may be found on responsive web designs that may be employed by websites or other portals. This context is merely used for the purposes of exposition and is not meant to limit the application of the present systems, methods and/or techniques of the present application.

Broadly speaking, modern tab control has two supported variants—horizontal and vertical. For one example (as is known in the art), a horizontal tab control may comprise different parts: a title, area for tabs and, possibly a dropdown menu. These parts may typically be displayed horizontally across a display screen and is capable of being interactive with the user. A typical vertical tab control may comprise a title and an area for tabs. In this example, the area for tabs may be displayed underneath the title and may be capable being interactive with the user. If one theme in the area for tabs is activated, then there may be another column displayed which may have content that is germane or associated with the theme.

Table 1 below is one exemplary implementation of the tabular embodiment of FIGS. 3, 4 and 5 above. The implementation starts from designing the rendering of the page using XSLT technology to render the content in the natural flow.

TABLE 1

Responsive UI For Tabular Data

```
<div class="default-table-block">
    <div class="table-comparison-title">
        <h2 class="headingBase headingM">
            Simple file sharing
        </h2>
    </div>
    <table class="table-comparison-wide table-comparison-wide_5col" summary="">
        <thead>
            <tr>
                <th class="table-comparison-header-cell-first">
                    <div class="table-comparison-cell-first-content">
                        <h2 class="headingBase headingM">
                            Simple file sharing
                        </h2>
                    </div>
                </th>
                <th class="table-comparison-header-cell">
                    <h2 class="headingBase headingXS">
                        SkyDrive
                    </h2>
                </th>
                <th class="table-comparison-header-cell">
                    <h2 class="headingBase headingXS">
                        Apple iCloud
                    </h2>
                </th>
                <th class="table-comparison-header-cell">
                    <h2 class="headingBase headingXS">
                        Google Drive
                    </h2>
                </th>
                <th class="table-comparison-header-cell">
                    <h2 class="headingBase headingXS">
                        Dropbox
                    </h2>
                </th>
            </tr>
        </thead>
        <tbody>
```

TABLE 1-continued

Responsive UI For Tabular Data

```
            <tr>
                <td class="table-comparison-standard-cell-first">
                    <div class="table-cell-content">
                        <p class="para">Share with anyone</p>
                    </div>
                </td>
                <td class="section-cell-comparison-nocolor section-cell-comparison">
                    <div class="table-header-cell-copy">
                        <h2 class="headingBase headingXS">
                            SkyDrive
                        </h2>
                    </div>
                    <div class="table-cell-content">
                        <div class="para">
                            <img class="embedObject"
src="http://res2.windows.microsoft.com/resbox/en/storage/main/2c6b
2adc-235b-48e3-b0bc-40192b9c9161_8.png" alt="Check mark" data-
id="pageContainer1_ID6EBBHDA">
                        </div>
                    </div>
                </td>
                <td class="section-cell-comparison-nocolor section-cell-comparison">
                    <div class="table-header-cell-copy">
                        <h2 class="headingBase headingXS">
                            Apple iCloud
                        </h2>
                    </div>
                    <div class="table-cell-content">
                        <p class="para noTextElement"></p>
                    </div>
                </td>
                <td class="section-cell-comparison-nocolor section-cell-comparison">
                    <div class="table-header-cell-copy">
                        <h2 class="headingBase headingXS">
                            Google Drive
                        </h2>
                    </div>
                    <div class="table-cell-content">
                        <div class="para">
                            <img class="embedObject"
src="http://res2.windows.microsoft.com/resbox/en/storage/main/2c6b
2adc-235b-48e3-b0bc-40192b9c9161_8.png" alt="Check mark" data-
id="pageContainer1_ID6EBBDDA">
                        </div>
                    </div>
                </td>
                <td class="section-cell-comparison-nocolor section-cell-comparison">
                    <div class="table-header-cell-copy">
                        <h2 class="headingBase headingXS">
                            Dropbox
                        </h2>
                    </div>
                    <div class="table-cell-content">
                        <div class="para">
                            <img class="embedObject"
src="http://res2.windows.microsoft.com/resbox/en/storage/main/2c6b
2adc-235b-48e3-b0bc-40192b9c9161_8.png" alt="Check mark" data-
id="pageContainer1_ID6EBBBDA">
                        </div>
                    </div>
                </td>
            </tr>
            <tr>
                <td class="table-comparison-standard-cell-first">
                    <div class="table-cell-content">
                        <p class="para">
                            Online viewing for Office files
                        </p>
                    </div>
                </td>
                <td class="section-cell-comparison-nocolor section-cell-comparison">
                    <div class="table-header-cell-copy">
                        <h2 class="headingBase headingXS">
                            SkyDrive
                        </h2>
                    </div>
                    <div class="table-cell-content">
                        <div class="para">
                            <img class="embedObject"
src="http://res2.windows.microsoft.com/resbox/en/storage/main/2c6b
2adc-235b-48e3-b0bc-40192b9c9161_8.png" alt="Check mark" data-
id="pageContainer1_ID6EBBHBA">
                        </div>
                    </div>
                </td>
                <td class="section-cell-comparison-nocolor section-cell-comparison">
                    <div class="table-header-cell-copy">
                        <h2 class="headingBase headingXS">
                            Apple iCloud
                        </h2>
                    </div>
                    <div class="table-cell-content">
                        <p class="para noTextElement"></p>
                    </div>
                </td>
                <td class="section-cell-comparison-nocolor section-cell-comparison">
                    <div class="table-header-cell-copy">
                        <h2 class="headingBase headingXS">
                            Google Drive
                        </h2>
                    </div>
                    <div class="table-cell-content">
                        <div class="para">
                            <img class="embedObject"
src="http://res2.windows.microsoft.com/resbox/en/storage/main/2c6b
2adc-235b-48e3-b0bc-40192b9c9161_8.png" alt="Check mark" data-
id="pageContainer1_ID6EBBDBA">
                        </div>
                    </div>
                </td>
                <td class="section-cell-comparison-nocolor section-cell-comparison">
                    <div class="table-header-cell-copy">
                        <h2 class="headingBase headingXS">
                            Dropbox
                        </h2>
                    </div>
                    <div class="table-cell-content">
                        <p class="para lastElement noTextElement"></p>
                    </div>
                </td>
            </tr>
        </tbody>
    </table>
</div>
```

The HTML above defines the structure of the responsive table. In the HTML, the duplicated header cells are visible with the class name "table-header-cell-copy", which allow the table to render in the smaller browser viewports by rendering the header in each row. CSS styles then target this specific class name to hide it in large viewports, and make it visible in small viewports.

One Possible Embodiment

Figure 6:
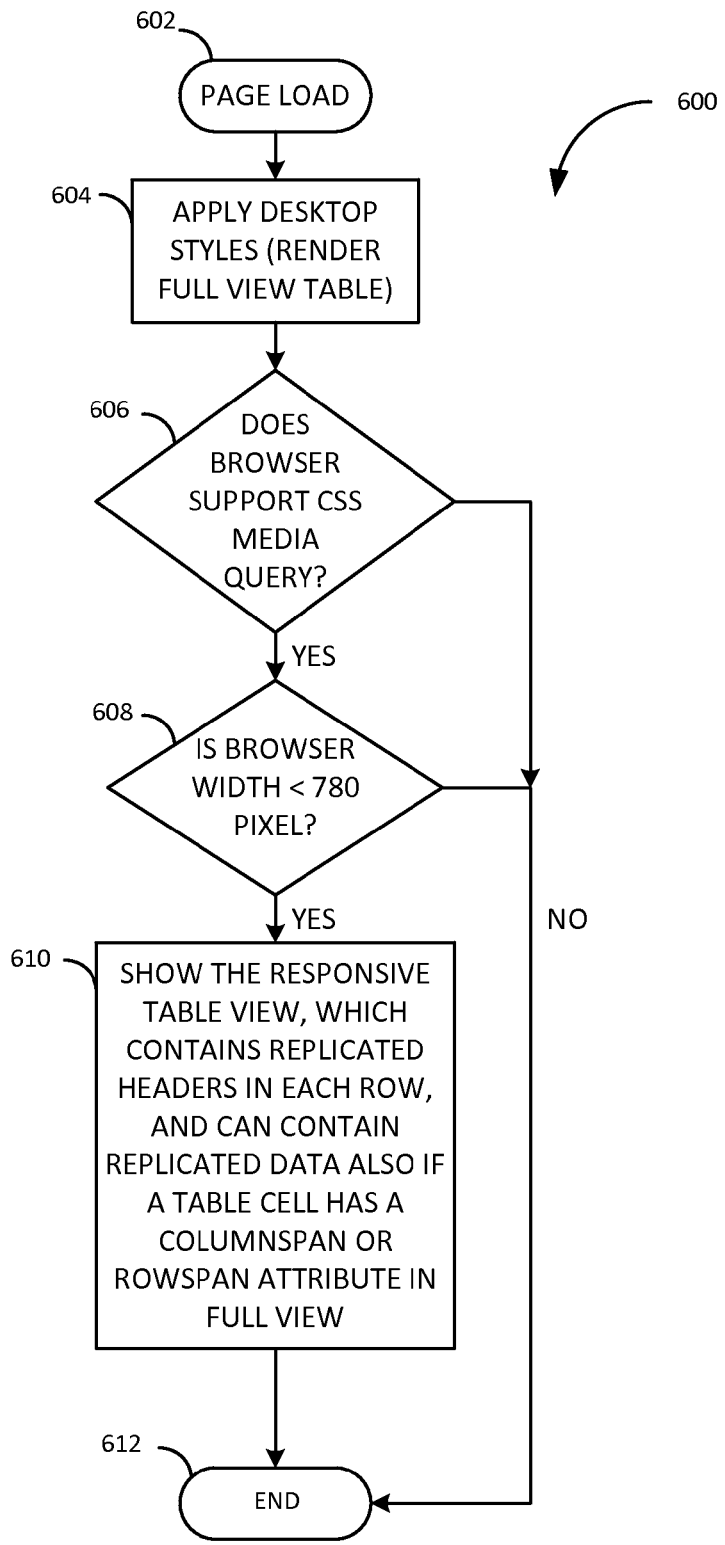
FIG. 6 depicts one embodiment of a flowchart that supports responsive UI as made in accordance with the principles of the present application.

FIG. 6 depicts one embodiment of a method/flowchart 600 that may implement the logic as described herein. The method starts a 602, possibly by loading a web page that uses responsive UI. At 604, the method may apply the largest viewport as is possible, for example (in the example of FIGS. 3 and 4), apply a desktop style and enable sidebars for further information. It will be appreciated that the method may start on any viewport size allowable in other embodiments.

At 606, the method may query as to whether the browser supports CSS media query. If not, the method may proceed to the end at 612. However, if it does, then the method may further query as to whether the browser width is less than a certain number of threshold/breakpoint pixels (e.g., 780 pixels in this case, other thresholds are of course possible) at 608. If not, then the browser viewport may not be changed and/or changing and the system may proceed to end 612.

However, if the browser width is less than a threshold/breakpoint size, then the system and/or method may reflow the layout of the tabular data as described herein and in conjunction with the example of FIGS. 3, 4 and 5 at 610. In one embodiment, the system and/or method may show the responsive table view—which may comprise replicated headers in each row and may comprise replicated data also if a table cell has a column span or rowspan attribute in full view.

It will be appreciated that the method of FIG. 6 may be running as a continuous loop and that the data may be resized into a laptop, tablet and/or mobile format as well—e.g., with different breakpoint and size resized as desired. Different thresholds and/or breakpoints may be associated with the various viewports.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A method for implementing a responsive UI on a client device by a server for rendering a set of tabular data across a plurality of browser viewports renderable on a display of the client device, the method comprising:
identifying the set of tabular data having nested data categories with multiple levels of logic with click targets for user interaction, said set of tabular data to be rendered in a browser on the client device for a user;
detecting, via communication with the client device, the viewport of the browser in which said set of tabular data are to be rendered; if the viewport is greater than a desired size, then rendering said set of tabular data in a first format, said first format formatting said set of tabular data in a multiple row and column spans;
if the viewport is less than or equal to a desired size, then rendering said set of tabular data in a second format, said second format comprising collapsing said column spans into a row in order to format column data to be substantially close to its associated row header; and
if the browser is resized to another screen size, affecting a dynamic reflow of said set of tabular data as appropriate for said resized screen according to the multiple levels of logic present in the nested data categories.

2. The method of claim 1 wherein said set of tabular data comprises a set of related row and column data.

3. The method of claim 1 wherein said set of tabular data comprises one of a group, said group comprising main data, row data and associated column data.

4. The method of claim 1 wherein detecting the viewport of the browser further comprises detecting the resizing of the viewport by the user via the UI components of the client device.

5. The method of claim 1 wherein detecting the viewport of the browser further comprises one of a group, said group comprising: detecting a user's sizing of the browser and detecting a setting from a server from which said set of tabular data are downloaded.

6. The method of claim 1 wherein detecting the viewport of the browser further comprises detecting the resizing of the viewport by an application running on user's client device.

7. The method of claim 3 wherein rendering said set of tabular data in a first format further comprises rendering the tabular data substantially with column data displayed in columns.

8. The method of claim 7 wherein rendering said set of tabular data in a first format further comprises rendering the column data substantially in a column span.

9. The method of claim 1 wherein rendering said set of tabular data in a second format further comprises rendering the tabular data substantially in a row span.

10. The method of claim 1 wherein said method further comprises reflowing said set of tabular data according to whether the browser viewport crosses one of a set of threshold sizes.

11. A computer system comprising:
a processor;
a computer readable memory, said computer readable memory capable of storing computer readable data and instructions;
a communications component, said communications component capable of receiving a set of tabular data further comprising a set of nested data categories from a second computer system external to said computer system;
wherein further said set of nested data categories comprises multiple levels of logic wherein different levels have click targets for user interaction;
a screen, said screen capable of rendering data and displaying said data to a user of said computer system;
a set of UI components, said set of UI components capable of being used by said user to interact with said data rendered on said screen;
a browser, said browser capable of being resized into one of a plurality of viewports and rendering said set of tabular data according to the current viewport of said browser; and
further wherein the rendering of said set of tabular data is reflowed according to the multiple levels of logic present in said nested data categories.

12. The system of claim 11 wherein said communication component is further capable of communicating with a server, said communication component receiving data from a webpage.

13. The system of claim 12 wherein said data received from a webpage comprises a set of tabular data, said tabular data further comprising: main data, row data and associated column data.

14. The system of claim 13 wherein said browser is further capable of being resized by said user using one of said set of UI components; and further wherein said if the viewport of said browser is decreased to a mobile viewport, then said tabular data is formatted such that said associated column data is positioned substantially in row format near its associated row data.

15. The system of claim 14 wherein the position of said associated column data is formatted in a reduced column format.

16. The system of claim 15 wherein if the viewport of said browser is increased to a larger viewport, then the position of said relevant data is positioned substantially in at least a two column format.

17. The system of claim 11 wherein said viewport is capable of being resized into one of a group, said group comprising: a mobile viewport, a tablet viewport, a laptop viewport, a desktop viewport.

18. A method for rendering data on a computer system from a webpage within a browser, said data from a webpage comprising a set of related data, said related data comprising main data, relevant data and ancillary data, said related data comprising multiple levels of logic the method comprising:
requesting a set of related data from a webpage hosted on a server, the server remote from said computer system;
downloading said set of related data from the webpage;
depending on the viewport of the browser running on the computer system, positioning the tabular data according to the viewport and according to the relevancy of the data in the multiple levels of logic wherein different levels of logic have click targets for user interaction.

19. The method of claim 18 wherein if the viewport is below a given threshold, positioning the column data substantially near the associated row data.

20. The method of claim 19 wherein if the viewport is below a given threshold, replicating the headers in each row.

* * * * *